(12) United States Patent
Toda

(10) Patent No.: US 8,230,186 B2
(45) Date of Patent: Jul. 24, 2012

(54) HYBRID RECORDING DEVICE

(75) Inventor: Seiji Toda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 538 days.

(21) Appl. No.: 12/411,811

(22) Filed: Mar. 26, 2009

(65) Prior Publication Data

US 2009/0245049 A1 Oct. 1, 2009

(30) Foreign Application Priority Data

Mar. 27, 2008 (JP) .................................. 2008-83705

(51) Int. Cl.
*G06F 12/00* (2006.01)
(52) U.S. Cl. ................. 711/162; 711/165; 711/E12.002; 711/170; 711/202; 369/84
(58) Field of Classification Search .................. 711/103, 711/162, E12.001, 165, 170, 202, 203; 369/53.31, 369/47.32, 84
See application file for complete search history.

(56) References Cited

U.S. PATENT DOCUMENTS

| 7,225,310 | B2 * | 5/2007 | Lee ............................... 711/165 |
| 2005/0161248 | A1 * | 7/2005 | Spruell ...................... 174/120 R |
| 2008/0104308 | A1 * | 5/2008 | Mo et al. ....................... 711/103 |
| 2008/0209151 | A1 * | 8/2008 | Inoue ............................ 711/167 |
| 2009/0083701 | A1 * | 3/2009 | LeDuc et al. ................. 707/102 |

FOREIGN PATENT DOCUMENTS

| JP | 06-314177 | | 11/1994 |
| JP | 2008-204574 | | 9/2008 |
| JP | 2009-187604 | | 8/2009 |
| JP | 20090187604 | A * | 8/2009 |
| WO | 2005/003952 | | 1/2005 |

OTHER PUBLICATIONS

Japanese Office Action issued Nov. 8, 2011 in corresponding Japanese Patent Application No. 2008-083705 (2 pages) (4 pages English Translation).

* cited by examiner

*Primary Examiner* — Pierre-Michel Bataille
(74) *Attorney, Agent, or Firm* — Staas & Halsey LLP

(57) ABSTRACT

A hybrid recording device having a non-volatile semiconductor memory and a recording magnetic disk includes a mapping unit that maps a first recording area in the recording magnetic disk and a second recording area in the non-volatile semiconductor memory, and a controller that controls an access to the second recording area mapped by the mapping unit when there is an access instruction to the first recording area.

10 Claims, 10 Drawing Sheets

| | NORMAL | | SPEED-UP AREA | REDUNDANCY AREA |
|---|---|---|---|---|
| READING PROCESSING | FROM RECORDING MAGNETIC DISK | | FROM FLASH MEMORY | FROM FLASH MEMORY |
| WRITING PROCESSING | FROM RECORDING MAGNETIC DISK | | DATA ARE WRITTEN INTO ONLY ONE RECORDING MEDIUM AT WRITE COMMAND RECEPTION TIME AND THEN ASYNCHRONOUSLY REFLECTED TO THE OTHER RECORDING MEDIUM | DATA ARE SYNCHRONOUSLY WRITTEN INTO RECORDING MAGNETIC DISK AND FLASH MEMORY AT WRITE COMMAND RECEPTION TIME |
| RESTORATION PROCESSING | ONE DATA IS BROKEN | RESTORATION IMPOSSIBLE | DATA ARE UNIFIED TO NON-DESTRUCTED DATA | DATA ARE UNIFIED TO NON-DESTRUCTED DATA |
| | BOTH DATA ARE BROKEN | RESTORATION IMPOSSIBLE | RESTORATION IMPOSSIBLE | RESTORATION IMPOSSIBLE |
| | BOTH DATA ARE MISMATCHED | | DATA ARE UNIFIED TO DATA OF RECORDING MAGNETIC DISK | DATA ARE UNIFORMED TO DATA HAVING LOW ERROR RATE IN ERROR CORRECTING CODE |

FIG. 3

220 BLOCK MANAGEMENT TABLE (MAPPING TABLE)

| BLOCK NUMBER | AREA ATTRIBUTE | MAGNETIC ADDRESS | MEMORY ADDRESS |
|---|---|---|---|
| 1 | SPEED-UP AREA | a | A |
| 2 | REDUNDANCY AREA | b | B |
| 3 | NORMAL | c | NULL |
| 4 | NORMAL | d | NULL |

FIG. 4

| | NORMAL | SPEED-UP AREA | REDUNDANCY AREA |
|---|---|---|---|
| READING PROCESSING | FROM RECORDING MAGNETIC DISK | FROM FLASH MEMORY | FROM FLASH MEMORY |
| WRITING PROCESSING | FROM RECORDING MAGNETIC DISK | DATA ARE WRITTEN INTO ONLY ONE RECORDING MEDIUM AT WRITE COMMAND RECEPTION TIME AND THEN ASYNCHRONOUSLY REFLECTED TO THE OTHER RECORDING MEDIUM | DATA ARE SYNCHRONOUSLY WRITTEN INTO RECORDING MAGNETIC DISK AND FLASH MEMORY AT WRITE COMMAND RECEPTION TIME |
| RESTORATION PROCESSING — ONE DATA IS BROKEN | RESTORATION IMPOSSIBLE | DATA ARE UNIFIED TO NON-DESTRUCTED DATA | DATA ARE UNIFIED TO NON-DESTRUCTED DATA |
| RESTORATION PROCESSING — BOTH DATA ARE BROKEN | RESTORATION IMPOSSIBLE | RESTORATION IMPOSSIBLE | RESTORATION IMPOSSIBLE |
| RESTORATION PROCESSING — BOTH DATA ARE MISMATCHED | | DATA ARE UNIFIED TO DATA OF RECORDING MAGNETIC DISK | DATA ARE UNIFORMED TO DATA HAVING LOW ERROR RATE IN ERROR CORRECTING CODE |

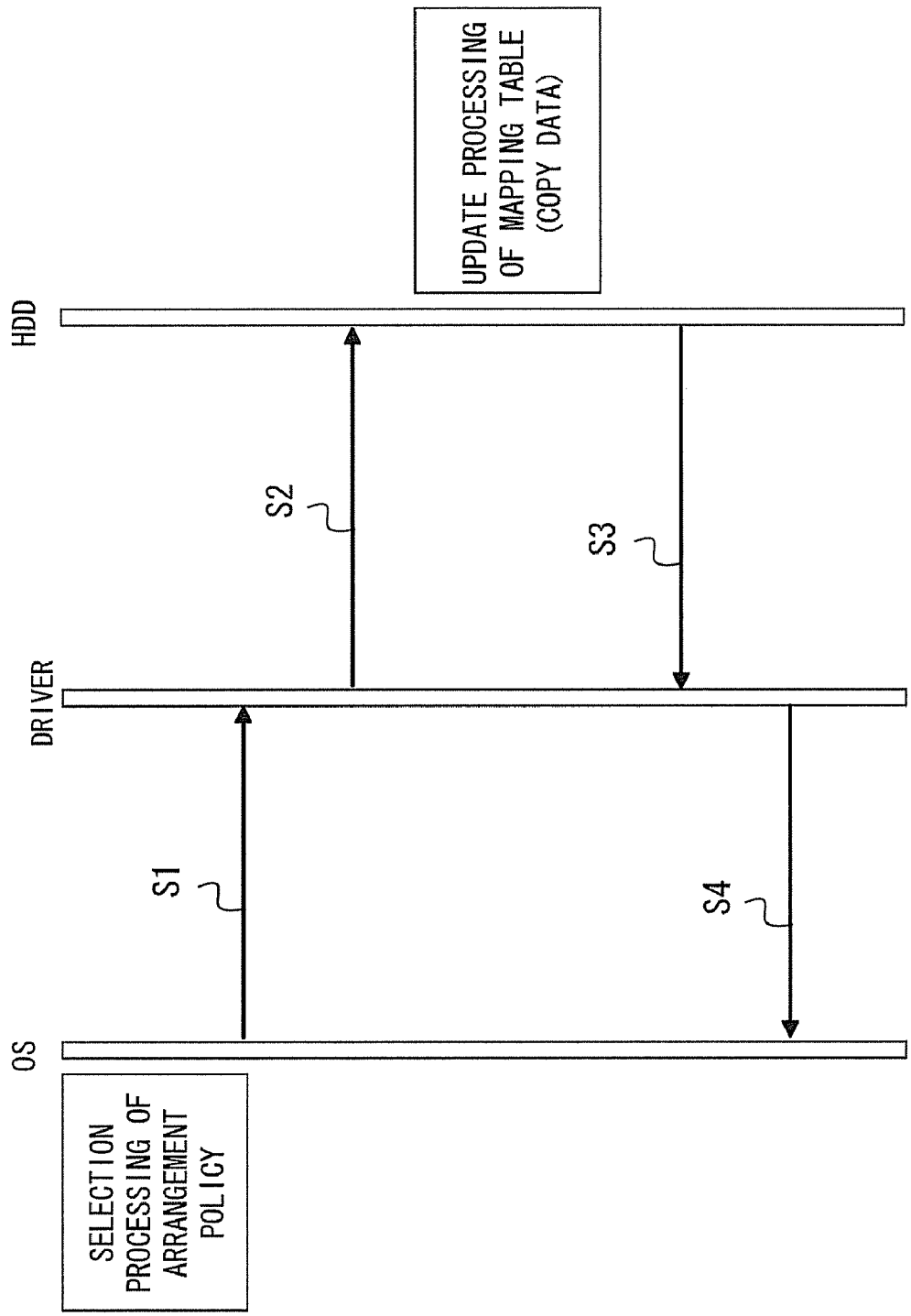

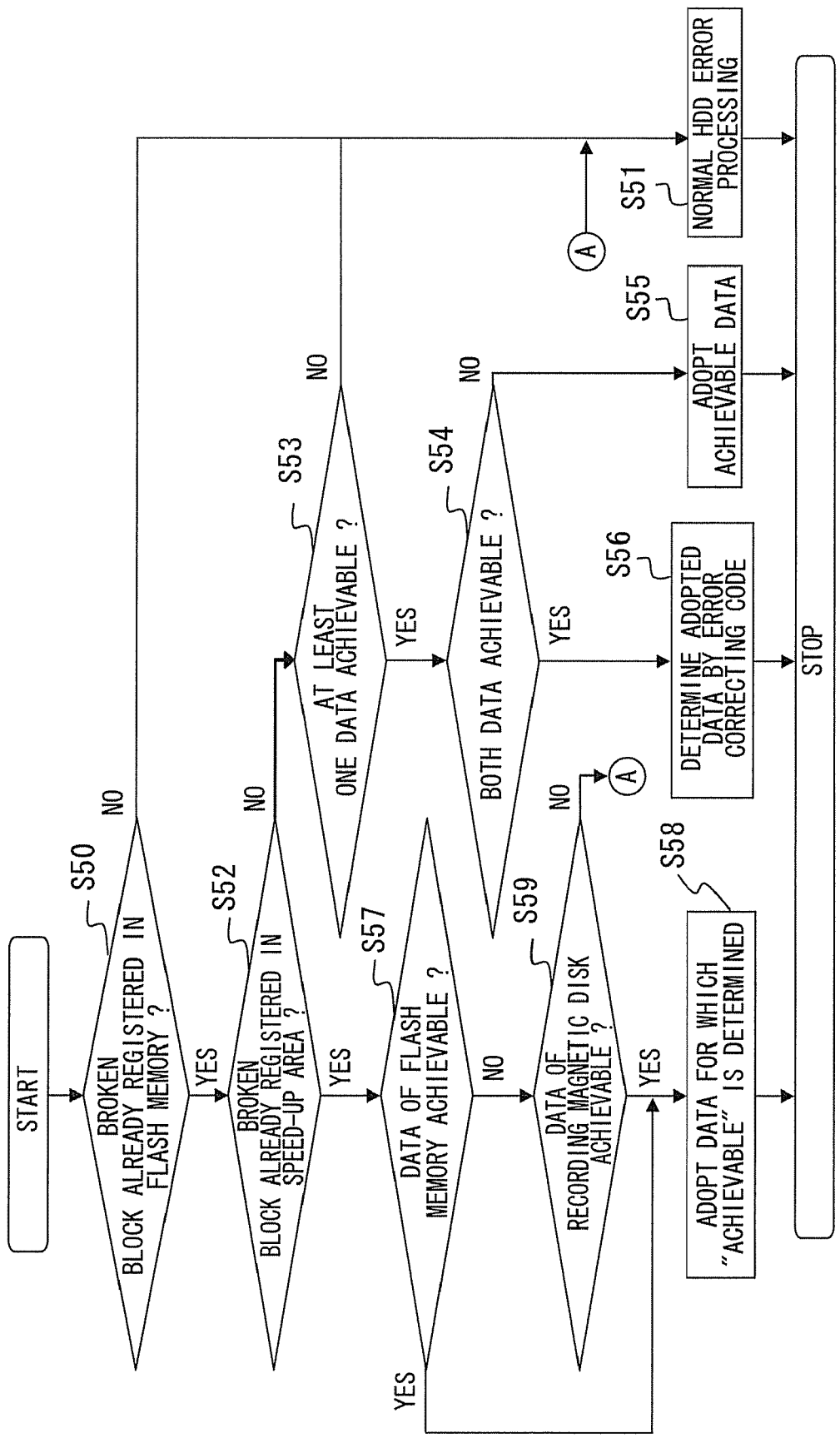

HYBRID RECORDING DEVICE

CROSS-REFERENCE TO RELATED APPLICATIONS

This application is based upon and claims the benefit of priority from the prior Japanese Patent Application No. 2008-83705 filed on Mar. 27, 2008, the entire contents of which are incorporated herein by reference

BACKGROUND

1. Field of the Invention

The embodiment discussed herein is related to a hybrid recording device that has a non-volatile semiconductor memory and a recording magnetic disk.

2. Description of the Related Art

Recently, hybrid recording devices each of which has a non-volatile semiconductor memory mounted therein together with a recording magnetic disc have appeared on the market. One of the hybrid recording devices is designed so that the non-volatile semiconductor memory is treated equally with the recording magnetic disk and data are arranged in the recording area of any one of the non-volatile semiconductor memory and the recording magnetic disk (see Japanese Laid-Open Patent Publication No. 6-314177).

In general, recording devices treat all data equally. On the other hand, in an external device (host computer) for transmitting/receiving data to/from a recording device, an access frequency of data, the level of importance of data, etc. are recorded in a policy table and managed while bringing each data with its meaning/treatment.

Accordingly, when access target data in a recording device is accessed at a high access frequency, it is desired to increase the access speed for the data, and when the level of importance of access target data is high, it is desired to prevent occurrence of an access error due to data loss or data breaking.

As described above, the hybrid recording device has a recording magnetic disk and a non-volatile semiconductor memory. These two recording media are effective to redundancy of important data if the recording media are made to hold the same data, and also effective to speed-up of data access by setting the non-volatile semiconductor memory to the access target.

However, the conventional hybrid recording device arbitrarily records data over the whole recording area of the non-volatile semiconductor memory irrespective of the meaning (intent and/or treatment) which the above external device has with respect to data although the hybrid recording device has both the recording magnetic disk and the non-volatile semiconductor memory. Therefore, there is a problem that optimization information of a data access system (the level of importance, the access frequency, etc. to be managed in the policy table by the external device) of each data owned by the external device cannot be reflected to the hybrid recording device as the difference of the recording control system.

SUMMARY

According to an aspect of the embodiment of the present invention, a hybrid recording device having a non-volatile semiconductor memory and a recording magnetic disk includes a mapping unit that maps a first recording area in the recording magnetic disk and a second recording area in the non-volatile semiconductor memory, and a controller that controls an access to the second recording area mapped by the mapping unit when there is an access instruction to the first recording area.

Other aspects and advantages of the invention will be realized and attained by referring to the elements and combinations described with reference to the accompanying drawings, wherein like numerals refer to like parts throughout, and forming a part hereof, and as particularly pointed out in the claims.

It is to be understood that both foregoing general descriptions and the following detailed description are exemplary and explanatory and are not restrictive of invention, as claimed.

BRIEF DESCRIPTION OF THE DRAWINGS

FIG. 3 is a diagram showing the construction of a mapping table 220;

FIG. 4 is a diagram showing an example of the difference of processing corresponding to an area attribute;

FIG. 5 is a transmission sequence diagram between devices when the area attribute of a data block is registered from a host computer 3 to the hybrid recording device 2;

FIG. 10 is a flowchart showing restoration processing in the controller.

DETAILED DESCRIPTION OF THE PREFERRED EMBODIMENTS

Figure 1:
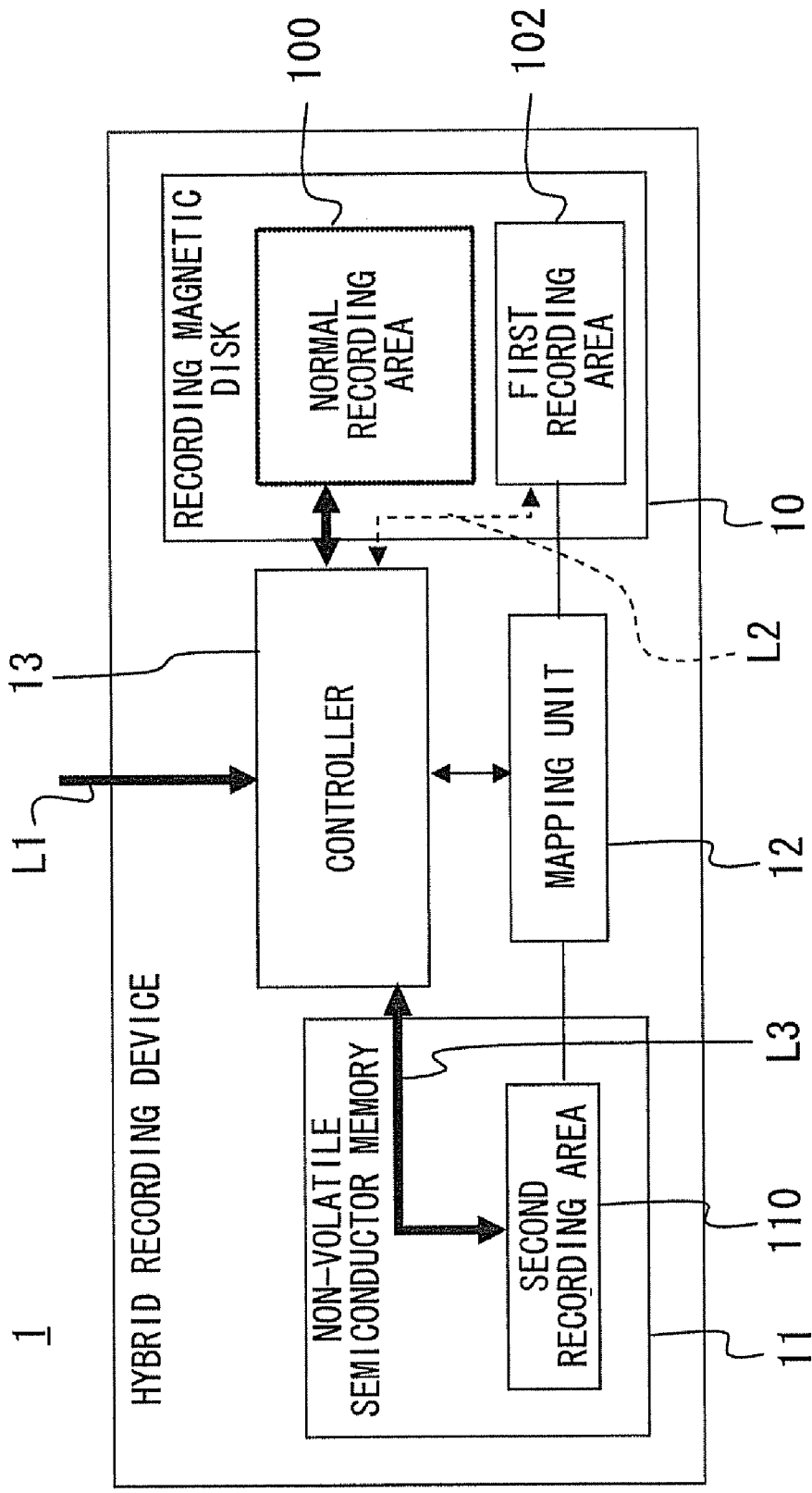
FIG. 1 is a diagram showing the logical construction of a hybrid recording device according to an embodiment of the present invention.

A preferred embodiment according to the present invention will be described with reference to the accompanying drawings. FIG. 1 is a diagram showing the logic construction of a hybrid recording device according to the present invention.

The hybrid recording device 1 of FIG. 1 has a recording magnetic disk 10 and a non-volatile semiconductor memory 11 as recording media, and a mapping unit 12 and a controller 13 as a unit for making these recording media selectively read/write data.

The recording area of the recording magnetic disk 10 is classified into a normal recording area 100 and a first recording area 102. The normal recording area 100 represents a recording area which is accessed by a conventional access system, and the first recording area 102 corresponds to a recording area which is a part of the normal recording area 100 and mapped with the recording area of the non-volatile semiconductor memory 11 (a second recording area 110 in FIG. 1) by the mapping unit 12.

The mapping unit 12 maps the normal recording area 100 in the recording magnetic disk 10 into the second recording area 110 in the non-volatile semiconductor memory 11 as the first recoding area 102 according to the recorded data as indicated by a solid line. The selection of data to be mapped is performed in conformity with information representing the level of importance and an access frequency (these information is generally named as "optimization information") owned by an external device such as a host computer or the like, for example.

The controller 13 receives an access command L1 (for example, read command, write command or the like) to the normal recording area 100, and controls an access to a passage indicated by a solid line L3, that is, an access to the second recording area 110 in place of a passage indicated by a broken line L2 when the access target is the first recording area 102 mapped by the mapping unit 12. When the access target is the normal recording area 100 other than the first recording area 102, the controller 13 accesses the normal recording area 100 as usual.

Accordingly, in the hybrid recording device 1 as described above, necessary data can be stored while dualized, that is, mutually corresponding recording areas can be allocated in both the recording magnetic disk 10 and the non-volatile semiconductor memory 11, and the same data or data which belong to the same system, but are different in update date and hour can be recorded in both the recording magnetic disk 10 and the non-volatile semiconductor memory 11.

Figure 2:
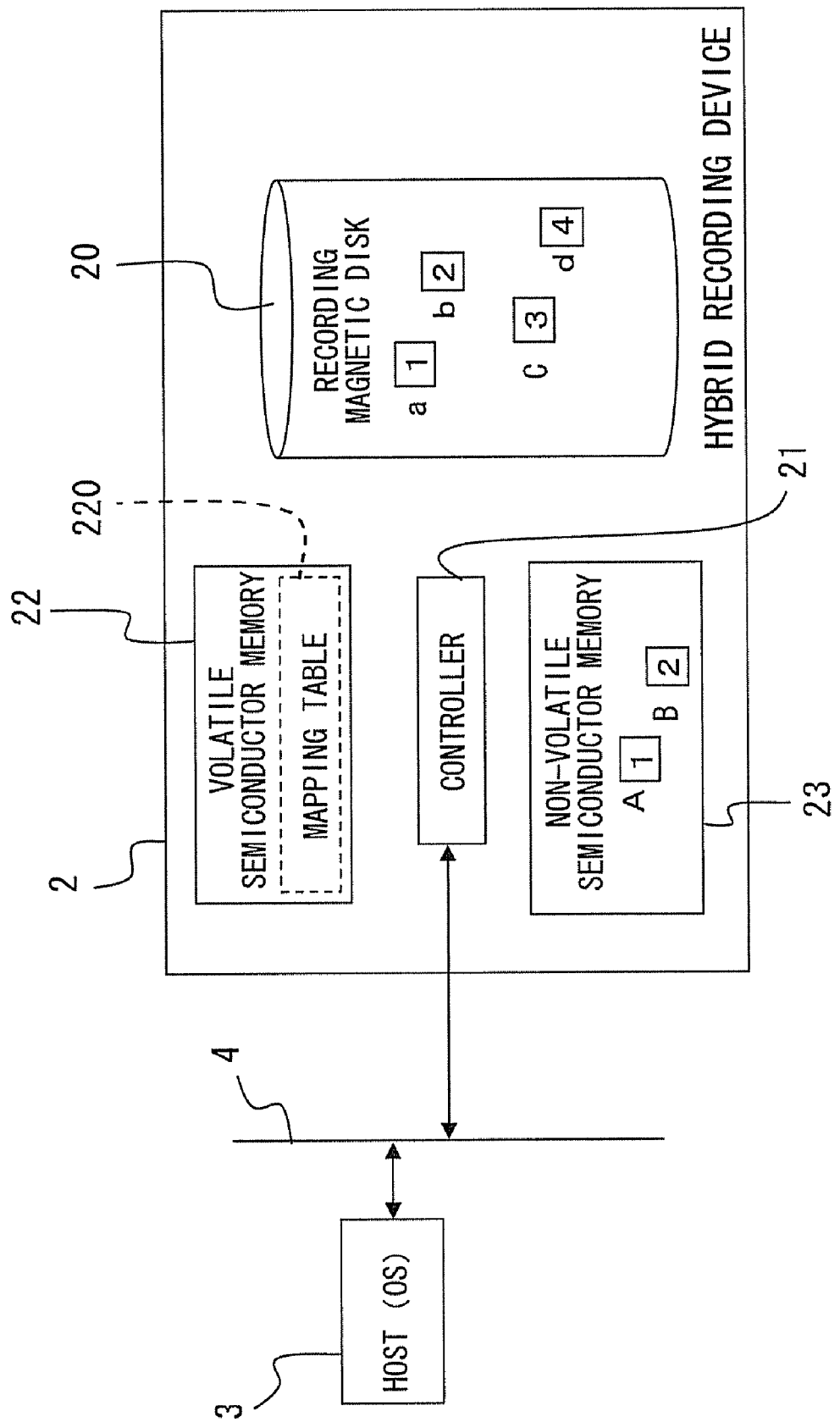
FIG. 2 is a diagram showing the system construction in a removable hybrid recording device according to the embodiment.

FIG. 2 is a diagram showing the system construction of an embodiment of the removable hybrid recording device 1 shown in FIG. 1.

The hybrid recording device 2 has a recording magnetic disk 20 as a data recording medium. The recording magnetic disk 20 is designed as a rotational circular disc in which a data recording area is provided on round tracks arranged at a predetermined interval from the center of the disk in the outer radial direction. The access to a predetermined address of the recording area is carried out under such a mechanical operation that a rotor arm (not shown) is rotated to move (seek) a magnetic head at the tip of the rotor arm onto a position above a predetermined track and the magnetic head scans the data area of the predetermined address on the track by rotating the disk.

The hybrid recording device 2 has a controller 21 for controlling each part, a volatile semiconductor memory 22 used mainly as a working area, and a non-volatile semiconductor memory (a flash memory is mainly used at present, and thus it will be hereinafter referred to as "flash memory") 23 as the above recording medium separately from the recording magnetic disk 20 under the state that these elements are connected to one another through a bus (not shown).

The host computer 3 recognizes and treats data as a cluster having a predetermined meaning (data block) at each hierarchical level (for example, driver level, application level, etc.), and manages the level of importance of data and the access frequency for every data block as part of or in connection with transceiving a data block to/from the controller 21. For example, the host computer 3 has commands (read command, write command, etc.) for making the controller 21 execute predetermined operations or non-registered plural commands (registering command, restoring command, etc.). In this case, as an example, the non-registered commands are allocated to "registering command" and "restoring command".

When the hybrid recording device 2 is connected to the host computer 3, the controller 21 executes communication processing with the host 3 through a bus 4. When receiving a command (for example, generally known write command, read command or newly mutually recognized registering command, restoring command or the like) from the host, the controller 21 controls each part in response to the command to execute the processing of recording received data, the processing of obtaining recorded data, the processing of restoring recorded data or the like as described later. Each processing is executed by executing a predetermined program through a built-in computer with each command as a trigger.

The volatile semiconductor memory 22 is provided as a temporary storing area which is used as a working area for data by the controller 21. In this embodiment, predetermined data recorded in the recording magnetic disk 20 are also held in the flash memory 23 to thereby dualize the data, and thus a corresponding table (mapping table 220) for mapping the mutual recording areas is temporarily held in the volatile semiconductor memory 22.

The flash memory 23 can electrically hold data even after the power is turned off, and also can execute data writing into an indicated address and also data reading from the address through electrical signal processing, so that high-speed access to the flash memory 23 can be performed. In this case, it is provided as a recording area to dualize predetermined data recorded in the recording magnetic disk 20. In this embodiment, it is assumed that a recoding area for preserving the mapping table 220 when the power is turned off is allocated. When the power is turned off, the mapping table 220 in the volatile semiconductor memory 22 is evacuated to any non-volatile recording area concerned, for example, the flash memory 23 and/or the recording magnetic disk 20, and when the power is turned on, the mapping table 220 evacuated at the power-off time is read out from the recording area concerned again and then arranged on the volatile semiconductor memory 22 again.

FIG. 3 is a diagram showing an example of the construction of the mapping table 220.

In the example of FIG. 3, the mapping table 220 comprises four items of "data block number (block number)", "area attribute", "magnetic address" and "memory address".

The "area attribute" is an item representing the attribute information of a received data block which the controller 21 is enabled to recognize on the basis of a registering command described later which is mutually recognized between the controller 21 and the host 3. In this case, three kinds of area attribute of "redundancy area", "speed-up area" and "normal" are provided as the area attribute. The "redundancy area" is indicated to data blocks which require redundancy like a data block having high level of importance, etc., for example. The "speed-up area" is indicated to data blocks which require speed-up like a data block having a high access frequency, etc., for example. The "normal" is indicated to data blocks which belong to neither "redundancy area" nor "speed-up area", that is, data blocks which are accessed by the conventional access system.

The "magnetic address" and the "memory address" are, respectively, the address of a recording area in the recording magnetic disc 20 in which the above data block is recorded, and the address of a recording area in the flash memory 23 in which the above data block is recorded.

In this example, it is indicated that the data block of the block number "1" is to be recorded or has been recorded in the recording area "a" of the recording magnetic disk 20. Furthermore, it is also indicated that this data block is indicated as belonging to the "speed-up area" by the host. Furthermore, it is also indicated that the recording area "A" in the flash memory 23 is allocated as a recording area for dualizing the recording of this data block. By establishing the above corresponding relationship in the mapping table, the recording area "a" in the recording magnetic disk 20 and the recording area "A" in the flash memory 23 are actually associated with each other as shown in FIG. 2 in the subsequent processing, and the data are dualized as the speed-up area. Likewise, it is indicated that the data block of the block number "2" is to be recorded or has been recorded in the recording area "b" of the recording magnetic disk 20. Furthermore, it is also indicated that this data block is indicated as belonging to the "redundancy area" by the host. It is also indicated that the recording area "B" in the flash memory 23 is allocated as a recording area to dualize the recording of this data block. By establishing the above corresponding relationship in the mapping table, the recording area "b" in the recording magnetic disk 20 and the recording area "B" in the flash memory 23 are actually associated with each other as shown in FIG. 2 in the subsequent processing, and the data are dualized as the redundancy area.

On the other hand, with respect to the data blocks of the block numbers "3" and "4" which are set to "normal", each recording area exists in only the recording magnetic disk 20 as indicated by "c" and "d" in FIG. 2, and no dualized recording area exists in the flash memory 23.

As described above, in this embodiment, with respect to only the data block which is indicated as "speed-up area" or "redundancy area" from the host, the recording area in the recording magnetic disk 20 of the data block concerned acts as the first recording area, and the recording area corresponding to the first recording area that is, the second recording area is allocated in the flash memory 23.

FIG. 4 shows an example of the difference of the processing corresponding to the area attribute.

In this case, with respect to the "speed-up area" and the "redundancy area", the different points among the reading processing, the writing processing and the restoration processing are listed in a table.

In the first reading processing, when the area attribute of a data block to be read out indicates any one of "speed-up area" and "redundancy area", the data are read out from the non-volatile semiconductor memory (flash memory). When the area attribute indicates "normal area", the data are read out from the recording magnetic disk. Accordingly, the processing is changed in accordance with the area attribute.

In the second writing processing, when the area attribute of the data block to be written indicates "speed-up area", data are written into only one recording medium (particularly, the non-volatile semiconductor memory) at the reception time of a write command, and then the data concerned are asynchronously copied to the other recording medium (the non-volatile semiconductor memory or the recording magnetic disk) (write back). On the other hand, when the area attribute of the data block to be written indicates "redundancy area", data are synchronously written into both the recording media (the non-volatile semiconductor memory and the recording magnetic disk) at the reception time of the write command (write through). This shows that the processing is changed in accordance with the area attribute. Furthermore, when the area attribute indicates "normal area", data are directly written into the recording magnetic disk, and from this sense, the processing is also changed in accordance with the area attribute.

In the third restoration processing, when it is assumed that any one of the dualized data blocks is broken (for example, the data cannot be read out because the recording magnetic disk is physically broken), the broken data block is restored in conformity with the other normal data block even when the area attribute of the data block indicates any one of "speed-up area" and "redundancy area". When the area attribute indicates "normal", data exist in only the recording magnetic disk, and thus it is impossible to restore the data. Accordingly, it is clear that the processing is different in accordance with the area attribute. Likewise, when it is assumed that both the dualized data blocks are broken, the restoration is impossible even when the area attribute indicates any one of "speed-up area" and "redundancy area".

In the third restoration processing, when it is assumed that both the dualized data blocks are not coincident with each other (for example, bit inversion occurs or the like), both the data are matched with the data in the recording magnetic disk when the area attribute of the data block indicates "speed-up area", and also both the data are matched with the data having a lower error rate in error-correcting code when the area attribute concerned indicates "redundancy area". This indicates that the processing is different in accordance with the area attribute.

Next, the operation flow of the host computer 3 and the hybrid recording device 2 in this embodiment will be described.

FIG. 5 is a communication sequence diagram between devices when the area attribute of the data block is registered from the host computer 3 to the hybrid recording device 2. In this case, a registering command described later is generated by the driver in the host computer 3 for the hybrid recording device 1.

First, at the host computer 3 (OS) side, the area attribute of a data block to be transmitted/received to/from the hybrid recording device 1 is selected (the selection processing of an arrangement policy described later), and a registering instruction signal is output to the driver while area attribute information of the data block concerned is attached to the registering instruction signal (S1).

When the driver receives the registering instruction signal from the host computer 3 (OS) and also receives information of a predetermined area attribute (in this case, information representing "redundancy area" or "speed-up area"), the driver issues a registering command, and outputs a registering instruction containing the corresponding recording area of the data block concerned and the information representing the area attribute to the controller 21 (S2). The corresponding recording area is the information representing the recording area in the recording magnetic disk of the data block which is generated on the basis of the corresponding table of the block number and the recording area managed by the driver from the block number transmitted from the host while contained in the registering instruction signal.

When receiving the registering instruction from the driver, the controller 21 returns a command to the driver to respond to the registering command (S3). For example, if the registration processing described later is normally executed in the controller, the controller returns a command representing registration completion to the driver, and if there is an error, the controller returns an error command to the driver.

The driver outputs the registering command to the controller 21 again when it receives the response representing a reception error from the controller, when there is no response for a predetermined time or the like. When receiving the command representing the registration completion or the error command, the driver returns a registration completion notification to the host computer (S4).

Figure 6:
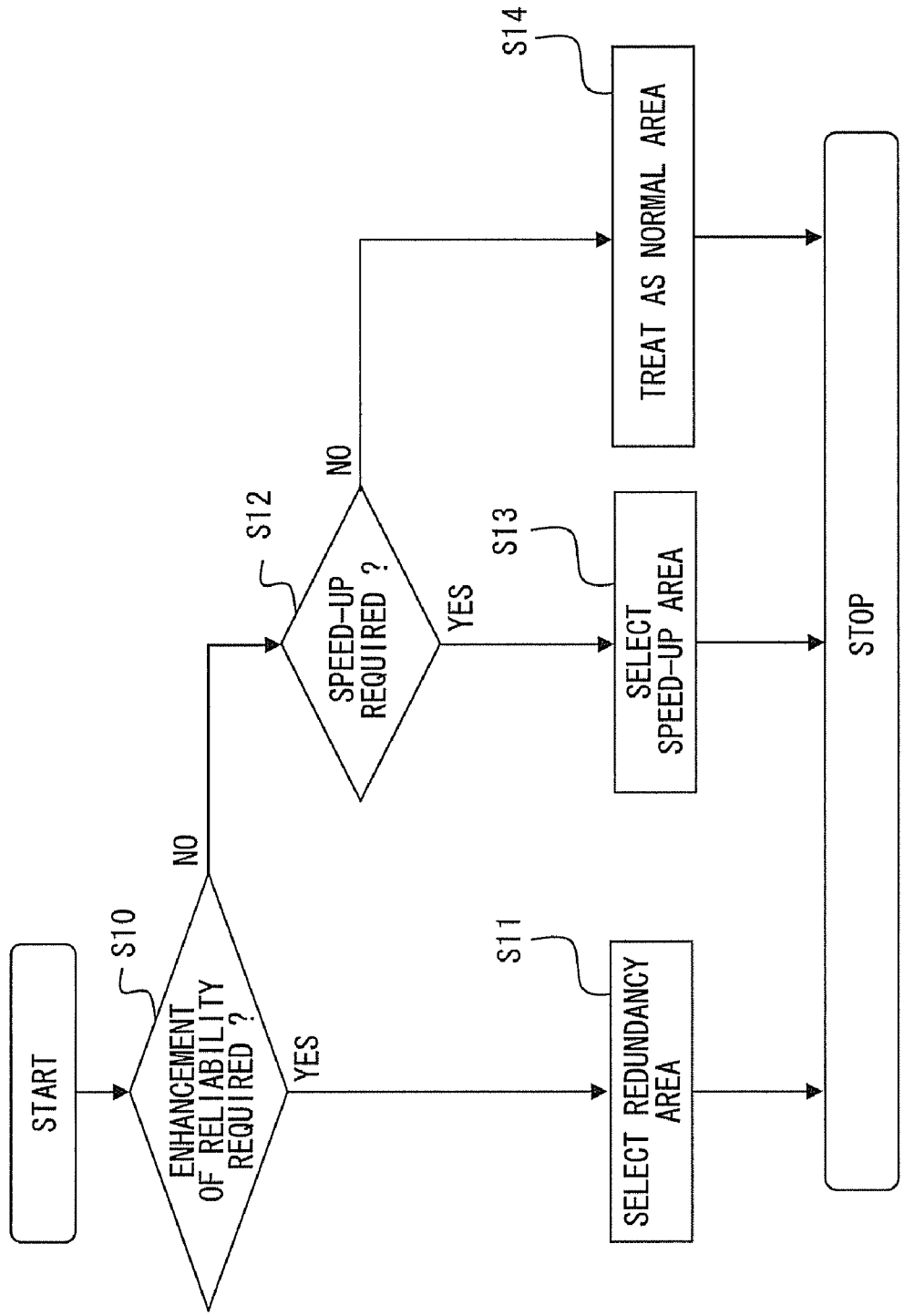
FIG. 6 is a flowchart showing the processing of selecting an arrangement policy of a data block in S1 of FIG. 5.

FIG. 6 is a flowchart showing the processing of selecting the arrangement policy of the data block in S1 of FIG. 5.

In the host computer 3, the level of importance of data and the access frequency to the controller 21 are managed in a policy table every data to be transmitted/received to/from the hybrid recording device 2 (data based on each data block). In this embodiment, the host computer 3 refers to the policy table to select the arrangement policy of the data block.

First, it is determined from the policy table whether there is any data block having a high level of importance of data (high reliability is required) (S10). When there is a data block to which high reliability is required, the block number thereof is selected as belonging to "redundancy area" (S11).

Subsequently, it is determined from the policy table whether there is any data block having a high access frequency (speed-up is required) (S12). When there is a data block to which speed-up is required, the block number thereof is selected as belonging to "speed-up area" (S13).

With respect to data blocks which do not belong to both the above cases, the selection is carried out according to the setting in the host, however, they are not recognized at the hybrid recording device 1 side in this embodiment, so that they are distinctly treated as belonging to "normal area" as has often been the case in the past (S14).

Figure 7:
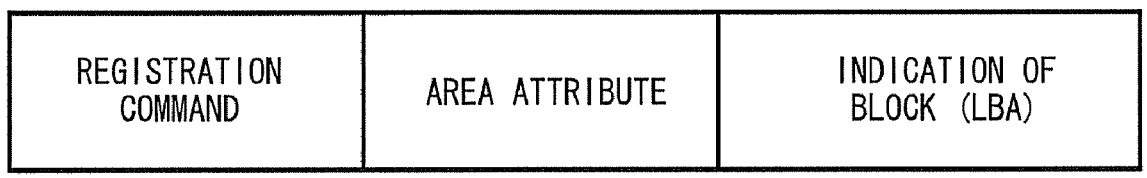
FIG. 7 is a diagram showing the construction of a registering command generated by a driver in S2 of FIG. 5.

FIG. 7 is a diagram showing the construction of the registering instruction generated by the driver in S2 of FIG. 5.

As shown in FIG. 7, the registering instruction comprises a registering command, information representing the area attribute and information representing the recording area in the recording magnetic disk of the data block. The information representing the recording area in the recording magnetic disk of the data block is generated on the basis of the block number managed by the driver and the corresponding table of the recording area, from the block number which is transmitted from the host while the block number is contained in the registering instruction signal.

Figure 8:
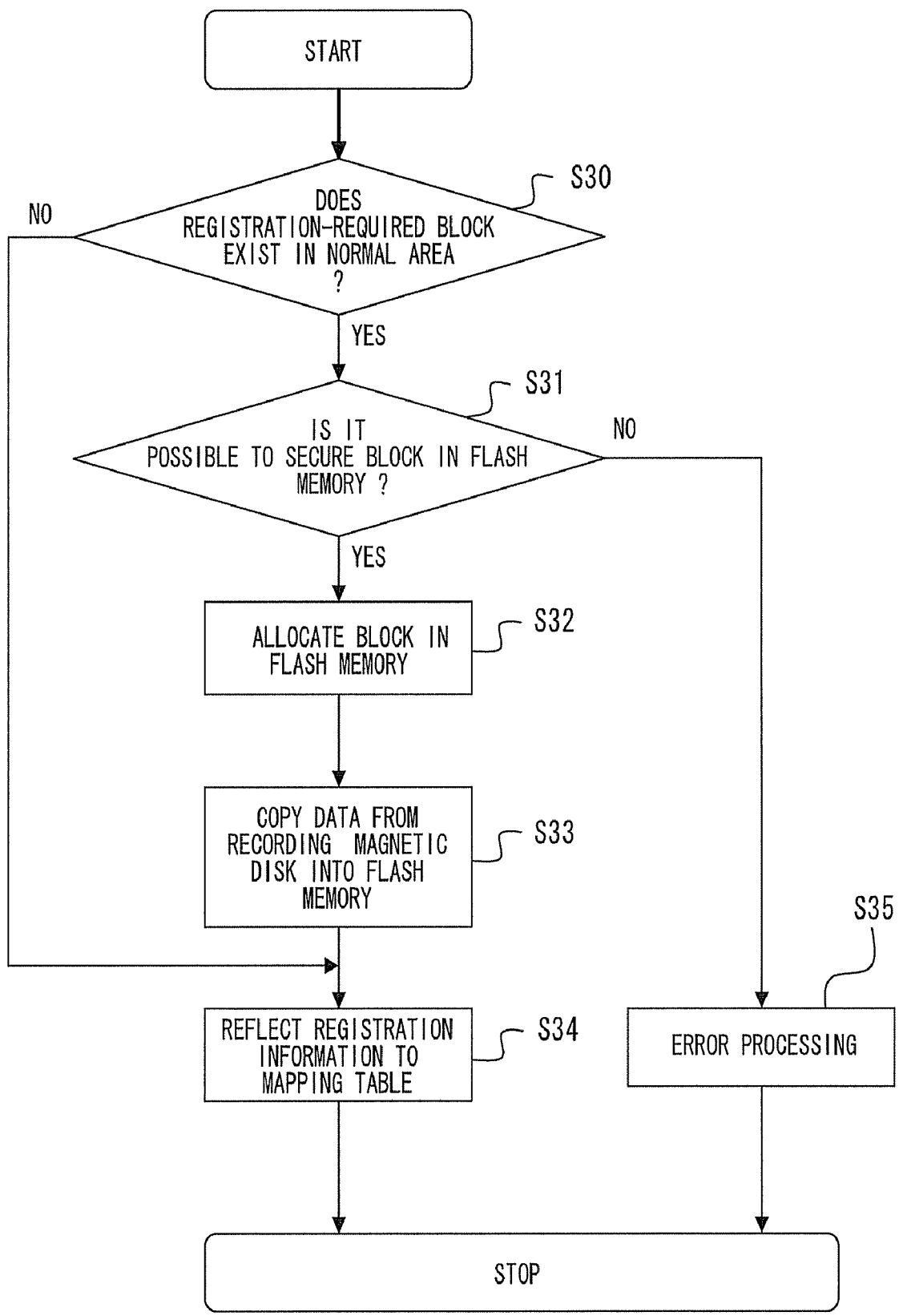
FIG. 8 is a flowchart showing registration processing in a controller.

FIG. 8 is a flowchart showing the registration processing in the controller.

In this case, FIG. 8 shows the processing after the registering instruction for "redundancy area" or "speed up area" is received from the driver.

First, the "magnetic address" of the mapping table is searched on the basis of the information representing the recording area therein contained in the registering instruction, and checks the information of the "area attribute" of the corresponding record (S30).

Here, if "normal area (in this case, an area other than "redundancy area" and "speed-up area")" is set in the "area attribute", it indicates that a recording area for dualization is not allocated in the flash memory, and thus it is checked whether there is any empty area for the recording area concerned in the flash memory (S31). If an empty area for the recording area concerned exists in the flash memory, the empty area is allocated (S32), and the data of the recording area in the recording magnetic disk is copied into the empty area (S33).

The information (normal area) of "area attribute" of the mapping table is altered to the information (the speed-up area or the redundancy area) representing the area attribute contained in the registering instruction, and further the memory address of the copy area is set to "memory address", whereby the content of the registering instruction is reflected to the mapping table (S34).

If it is confirmed in S30 that "normal area" is not set to "area attribute", this means that "redundancy area" or "speed-up area" has been already set, and thus it is unnecessary to newly allocate a recording area for dualization in the flash memory. Accordingly, in this case, the processing is jumped to S34, and by altering the information of "area attribute" of the mapping table to the information representing "area attribute" contained in the registering instruction, the content of the registering instruction is reflected to the mapping table. Furthermore, when it is confirmed in S31 that there is no empty area for the corresponding recording area in the flash memory, the processing is jumped to the error processing of S35, and the error command is returned to the driver, for example.

Figure 9:
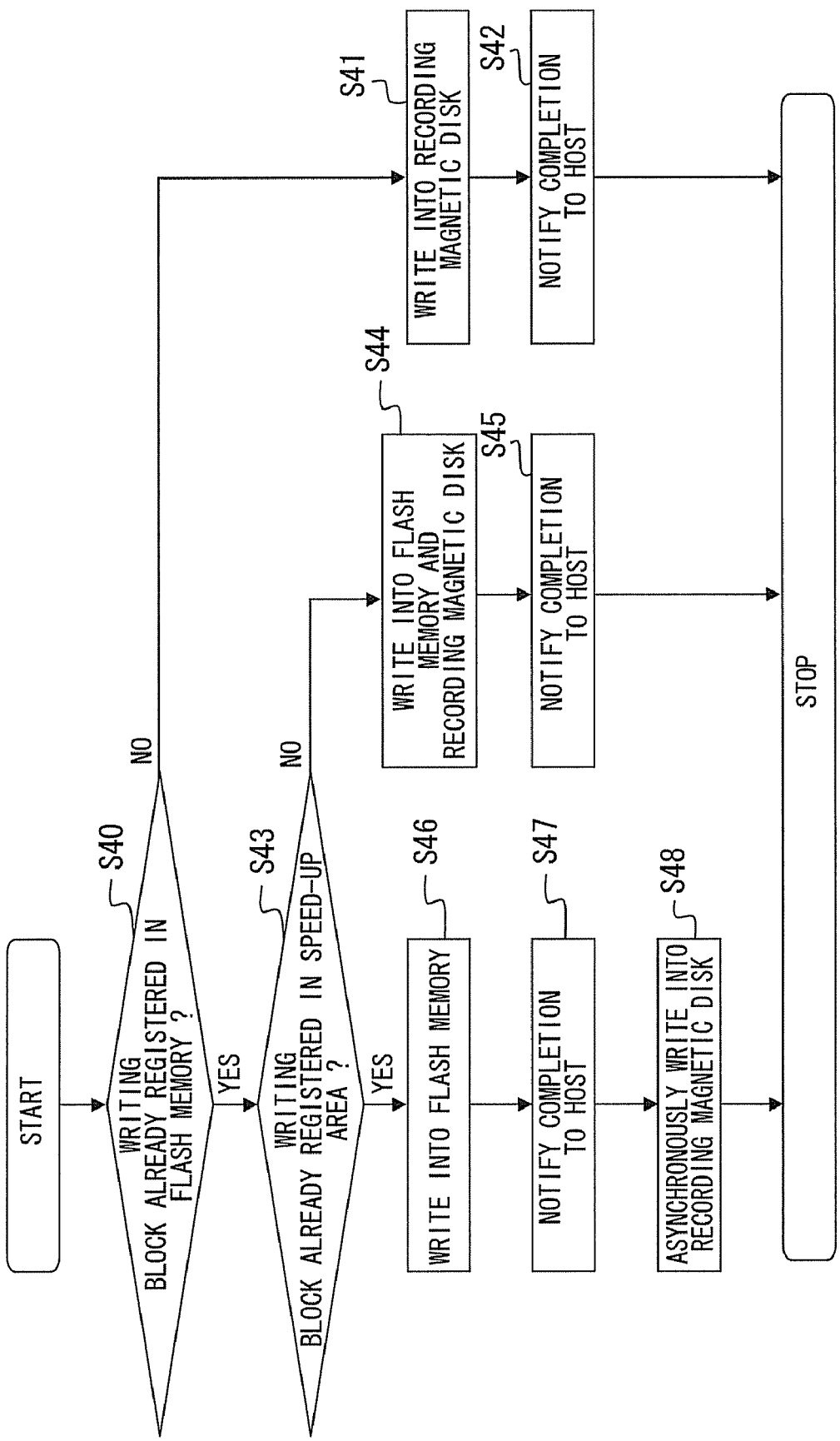
FIG. 9 is a flowchart showing writing processing of the controller.

FIG. 9 is a flowchart of the writing processing in the controller.

When the write command is received from the host 3 side through the driver, the "magnetic address" of the mapping table is searched on the basis of the information representing the recording area in the recording magnetic disk of the data block for which the write command is received, and checks whether the "area attribute" of the hit record is "normal area" (S40). Here, when it is confirmed that "area attribute" is "normal area", the processing of writing data into the recording area in the recording magnetic disk, that is, the conventional writing processing is executed (S41), and then the processing of returning a registration completion notification to the host 3 side is executed (S42).

On the other hand, when it is confirmed in S40 that "area attribute" is not "normal area", it is further checked whether the "area attribute" is "speed-up area" (S43). Here, when it is confirmed that the "area attribute" is not "speed-up area", the "area attribute" is the remaining one, that is, "redundancy area", and thus the processing (write through) of writing data into the corresponding recording areas of the flash memory and the recording magnetic disk on the basis of the "magnetic number" and the "memory number" of the hit record is executed (S44), and the processing of returning a registration completion notification to the host 3 side is executed (S45).

On the other hand, it is confirmed in S43 that the "area attribute" is "high-speed area", the processing of writing data into the corresponding recording area of the flash memory on the basis of the information of "memory number" of the hit record is first executed (S46), and then the processing of returning a registration completion notification to the host 3 side is executed (S47). Thereafter, when the situation is set to a predetermined condition, the processing of reflecting the latest data of the flash memory to the recording magnetic disk (write back) is executed (S48). Here, the "predetermined condition" means when the hybrid recording device 2 is turned on, when the hybrid recording device 2 is turned off, a time when there is no data to be read out/written from/into the external or when a renewal command is received from the host.

In the write-back processing, the processing is executed so that the information of the corresponding recording area in the recording magnetic disk is updated by the information of a predetermined recording area in the flash memory on the basis of the corresponding relationship between the "magnetic address" and the "memory address" of the mapping table is executed. This update may be collectively executed on all the "memory address" targets managed by the mapping table. Alternatively, non-updated "memory address" may be managed by the mapping table, and only non-updated information may be updated in the write-back processing.

Not shown in the figures, the reading processing in the controller is executed as follows. That is, when a read command is received from the host 3 side through the driver, the mapping table is referred to, and as shown in FIG. 4, the data of any one recording medium is accessed in accordance with the area attribute corresponding to the magnetic address at which the data block indicated by the read command is recorded. For example, when the area attribute indicates "speed-up area" or "redundancy area", a high-speed access is executed on the flash memory, and in the other cases, an access to only the recording magnetic disk (HDD access) is executed as has often been the case in the past.

FIG. 10 is a flowchart of the restoration processing in the controller.

This flow shows the difference of the processing in the restoration processing which is summarized in FIG. 4.

In this case, block numbers which cannot be read out from the host side, that is, the block numbers of data blocks recorded in recording areas which are physically broken, or the block numbers of data blocks on which results obtained by subjecting the read-out data to the error correction coding processing are worse than a predetermined value are collectively named as "trouble block", and the restoration processing on the trouble blocks in the controller will be described.

First, the record corresponding to the trouble block is searched from the mapping table, and the registration or non-registration of "memory address" is checked (S50). Here, when it is confirmed that the "memory address" is non-registered, this means that data exists in only the recording magnetic disk and the data of the trouble block is physically broken and thus it is impossible to be restored. Therefore, the conventional HDD error processing is executed (S51).

On the other hand, when it is confirmed in S50 that registered data exist in the "memory address", it is checked whether the "area attribute" corresponding to the registered data is "speed-up area" or not (S52). Here, when it is confirmed that the "area attribute" is not "speed-up area", this means that the "area attribute" is "redundancy area". Therefore, the processing of obtaining the remaining one data (that is, the data indicated in the "magnetic address" because the data indicated in the "memory address" corresponds to the trouble block) is executed. At this time, it is determined whether at least one data, containing the data of the trouble block, can be obtained or not (S53), and when both the data cannot be obtained, the conventional HDD error processing is executed (S51).

On the other hand, when at least one data can be obtained in S53, it is determined whether both the data can be obtained (S54). If only one data can be obtained, the data concerned is copied into the other recording medium (S55). If both the data can be obtained in S54, both the data are subjected to the error-correcting code processing, and the processing of matching both the data to the data having a lower error rate, that is, the processing of copying the data having the lower error rate to the other recording medium is executed (S56).

Furthermore, when it is confirmed in S52 that the "area attribute" is "speed-up area", it is first checked whether the data of the flash memory can be obtained (S57). If the data concerned can be obtained, the data of the flash memory is adopted because the data of the other recording medium may be broken, and the data of the flash memory is copied to the other recording medium (S58).

On the other hand, when it is confirmed in S57 that it is impossible to obtain the data of the flash memory, the processing of obtaining the data of the recording magnetic disk indicated by the "magnetic address" is executed (S59). If the data concerned cannot be obtained, the conventional HDD error processing is executed (S51). When the data concerned can be obtained, the data concerned is adopted and copied to the other flash memory.

The copy operation when the recording area is physically broken is carried out by allocating a new recording area for copy to an empty space of the recording medium, copying data into the newly allocated recording area and updating the "magnetic address" or "memory address" of the mapping table to the recording area for copy.

According to the hybrid recording device of this embodiment, the recording area in the flash memory can be allocated to a speed-up-required data area, a redundancy-required data area, etc. according to application from the host.

Furthermore, even when a conventional command is received from the host, the access control corresponding to the optimization information of data (the high-speed access processing, the redundancy processing, etc.) can be automatically performed in the hybrid recording device.

This contributes to shortening of the start-up time of OS when HDD is used as a start-up disk. With respect to OS, much time is required to carry out a mechanical operation (spin-up) of supplying power and rotating a medium. However, by mapping a file necessary for start-up in not only the recording magnetic disk, but also the non-volatile semiconductor memory, the high-speed access can be executed without waiting spin-up, and the rising time of OS can be shortened.

As described above, according to the hybrid recording device of this embodiment, the optimization information of each data which is owned by the external device can be reflected to the hybrid recording device as the difference of the recording control system.

A hybrid recording device has a non-volatile semiconductor memory and a recording magnetic disk, and is connectable to a host. The hybrid recording device includes a computer controller to execute mapping a first recording area in the recording magnetic disk and a second recording area in the non-volatile semiconductor memory; and controlling an access to the mapped second recording area when there is an access instruction to the first recording area. The hybrid recording device according to claim 1, wherein the mapping maps the first recording area and the second recording area while allocating an access optimization attribute to the first recording area, the second recording area, or any combinations thereof. The access optimization represents an access optimization based upon one or more of data reading, data writing and/or data communication. The access instruction includes the access optimization attribute and the computer controller executes accessing the first and/or second recording areas according to the access optimization attribute.

An apparatus, a method and a computer-readable recording medium according to the embodiments of the invention are provided. According to an aspect of the embodiments of the invention, any combinations of the described features, functions, operations, and/or benefits can be provided. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The apparatus (e.g., the host 3, the hybrid recording devices 1, 2) comprises a controller (CPU, controllers 13, 21) (e.g., a hardware logic circuitry based computer processor that processes or executes instructions, namely software/program), computer readable recording media, transmission communication media interface (network interface), and/or a display device, all in communication through a data communication bus. The results produced can be displayed on the display. A program/software implementing the embodiments may be recorded on computer-readable recording media. Examples of the computer-readable recording media include a magnetic recording apparatus 10, 20, an optical disk, a magneto-optical disk, and/or volatile and/or non-volatile semiconductor memory (for example, RAM 22, ROM, flash memory 11, 23, etc.). Examples of the magnetic recording apparatus include a hard disk drive (HDD), a floppy/flexible disk (FD), and a magnetic tape (MT). Examples of the optical disk include a DVD (Digital Versatile Disc), DVD-ROM, DVD-RAM (DVD- Random Access Memory), BD (Blue-ray Disk), a CD-ROM (Compact Disc-Read Only Memory), and a CD-R (Recordable)/RW.

The program/software implementing the embodiments may also be included/encoded as a data signal and transmitted over transmission communication media. A data signal moves on transmission communication media, such as the wired network or the wireless network, for example, by being incorporated in a carrier wave. However, the data signal may be transferred not by the carrier wave described above but as a so-called baseband signal. Such a carrier wave is transmitted in an electrical, magnetic or electromagnetic form, or an optical, acoustic or any other form.

The embodiment described above is a preferred exemplary embodiment. The present invention is not limited to this but various modifications can be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A hybrid recording device having a non-volatile semiconductor memory and a recording magnetic disk, comprising:
   a computer controller to execute
      mapping a first recording area in the recording magnetic disk and a second recording area in the non-volatile semiconductor memory; and
      controlling an access to the mapped second recording area when there is an access instruction to the first recording area,
   wherein the mapping maps the first recording area and the second recording area while allocating an attribute representing one or more of a redundancy area and/or a speed-up area to the first recording area and/or the second recording area, and
   in a case where a writing command is received as an access instruction to the first recording area, the computer controller executes writing common data into the first recording area and the second recording area when the attribute representing the redundancy area is allocated to the first recording area, and the computer controller executes writing latest data into the second recording area and also writing the latest data of the second recording area into the first recording area under only a predetermined condition when the attribute representing the speed-up area is allocated to the first recording area.

2. The hybrid recording device according to claim 1, wherein data set in the redundancy area and the speed-up area are read from the non-volatile semiconductor memory.

3. The hybrid recording device according to claim 1, wherein the device is connectable to a host, and a communication by the host indicates a data block and the mapping is according to a mapping table associating a recording area corresponding to the data block in the recording magnetic disk with a part of the recording area in the non-volatile semiconductor memory as the first recording area and the second recording area, respectively, and allocating the attribute to every pair of the first recording area and the second recording area.

4. The hybrid recording device according to claim 3, wherein when data of any one of the first recording area and the second recording area which are mapped while the attribute of the redundancy area is allocated thereto is broken, the computer controller executes restoring the broken data from normal data of the other recording area.

5. The hybrid recording device according to claim 3, wherein when both data of the first recording area and the second recording area which are mapped while the attribute of the redundancy area is allocated thereto are not matched with each other, the computer controller executes matching both data to a lower error rate by subjecting both data to error-correcting code processing.

6. The hybrid recording device according to claim 1, wherein when data of any one of the first recording area and the second recording area which are mapped while the attribute of the redundancy area is allocated thereto is broken, the computer controller executes restoring the broken data from normal data of the other recording area.

7. The hybrid recording device according to claim 6, wherein when both data of the first recording area and the second recording area which are mapped while the attribute of the redundancy area is allocated thereto are not matched with each other, the computer controller executes matching both data to a lower error rate by subjecting both data to error-correcting code processing.

8. The hybrid recording device according to claim 1, wherein when both data of the first recording area and the second recording area which are mapped while the attribute of the redundancy area is allocated thereto are not matched with each other, the computer controller executes matching both data to a lower error rate by subjecting both data to error-correcting code processing.

9. The hybrid recording device according to claim 1, wherein when data of any one of the first recording area and the second recording area which are mapped while the attribute of the speed-up area is allocated thereto is broken, the computer controller executes restoring the broken data from normal data of the other recording area.

10. A hybrid recording device for receiving as an access instruction a read command and a write command transmitted from a host and receiving a specific instruction as a registering instruction, and accesses a recording area in a recording magnetic disk when receiving the access instruction, comprising:
   a non-volatile semiconductor memory; and
   a computer controller to execute
      allocating a first recording area in the recording magnetic disk corresponding to a reception block from the host into the non-volatile semiconductor memory to dualize data when receiving the registering instruction from the host; and
      accessing the first recording area allocated in the non-volatile semiconductor memory by the allocating when an access instruction to the first recording area is received from the host,
   wherein the allocating allocates the first recording area in the recording magnetic disk corresponding to a reception block from the host into the non-volatile semiconductor memory as a redundancy area to dualize data when a registering instruction representing redundancy is received as the registering instruction from the host, and allocates the first recording area in the recording magnetic disk corresponding to a reception block from the host into the non-volatile semiconductor memory as a speed-up area to dualize data when receiving a registering instruction representing speed-up as the registering instruction from the host, and in a case where a writing command is received as an access instruction to the first recording area, the computer controller executes writing common data into the first recording area and the second recording area when a redundancy area of the first recording area is allocated in the non-volatile semiconductor memory, and also executes writing latest data into the second recording area when a speed-up area of the first recording area is allocated in the non-volatile semiconductor memory and writing the latest data of the second recording area into the first recording area under only a predetermined condition.

* * * * *